US012275271B2

(12) United States Patent
Homma

(10) Patent No.: US 12,275,271 B2
(45) Date of Patent: Apr. 15, 2025

(54) BALLPOINT PEN REFILL AND BALLPOINT PEN

(71) Applicant: MITSUBISHI PENCIL COMPANY, LIMITED, Tokyo (JP)

(72) Inventor: Yuichiro Homma, Shinagawa-ku (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/704,305

(22) PCT Filed: Oct. 19, 2022

(86) PCT No.: PCT/JP2022/038996
§ 371 (c)(1),
(2) Date: Apr. 24, 2024

(87) PCT Pub. No.: WO2023/074505
PCT Pub. Date: May 4, 2023

(65) Prior Publication Data

US 2024/0416674 A1 Dec. 19, 2024

(30) Foreign Application Priority Data

Oct. 29, 2021 (JP) ................................ 2021-178197
May 6, 2022 (JP) ................................ 2022-076687

(51) Int. Cl.
*B43K 7/04* (2006.01)
*B43K 1/08* (2006.01)
*B43K 7/00* (2006.01)

(52) U.S. Cl.
CPC ................ *B43K 7/04* (2013.01); *B43K 1/086* (2013.01); *B43K 7/005* (2013.01); *B43K 1/088* (2013.01)

(58) Field of Classification Search
CPC . B43K 7/04; B43K 7/005; B43K 7/00; B43K 7/10; B43K 1/08; B43K 1/082; B43K 1/086; B43K 1/088
(Continued)

(56) References Cited

U.S. PATENT DOCUMENTS 1,485,181 A * 2/1924 Grund ...................... B43K 1/08 401/214
9,352,350 B2 * 5/2016 Arminak .................. B05C 1/00
2015/0165812 A1 6/2015 Fukumoto et al.

FOREIGN PATENT DOCUMENTS

JP 2001-113874 A 4/2001
JP 2012-148423 A 8/2012
(Continued)

OTHER PUBLICATIONS

International Search Report & Written Opinion issued Nov. 22, 2022 in PCT/JP2022/038996 filed on Oct. 19, 2022, pages.

*Primary Examiner* — David J Walczak
(74) *Attorney, Agent, or Firm* — Oblon, McClelland, Maier & Neustadt, L.L.P.

(57) ABSTRACT

Provided is a ballpoint pen refill including: an ink storage tube made of a synthetic resin and storing an ink thereinside; a ball holder made of a synthetic resin and attached to a distal end of the ink storage tube; a ball pressing rod mounted inside the ball holder; and a writing ball stored in a distal end of the ball holder and having a rear end side held by the ball pressing rod, in which the ball pressing rod includes: a fixing portion fixed to the ball holder; a movable portion slidable in a front-rear direction with respect to the ball holder; a compression portion connecting the fixing portion and the movable portion; and a rearward movement restricting portion protruding from a distal end of the fixing portion and provided with a gap from a rear end of the compression portion.

11 Claims, 28 Drawing Sheets

(58) Field of Classification Search
USPC ........................................ 401/209, 214, 216
See application file for complete search history.

(56) References Cited

FOREIGN PATENT DOCUMENTS

| | | | |
|---|---|---|---|
| JP | 2013-252655 | A | 12/2013 |
| JP | 2019-010843 | A | 1/2019 |
| JP | 2019-010844 | A | 1/2019 |

* cited by examiner

BALLPOINT PEN REFILL AND BALLPOINT PEN

TECHNICAL FIELD

The present invention relates to a ballpoint pen refill and a ballpoint pen.

BACKGROUND ART

Japanese Patent Application Laid-Open (JP-A) No. 2013-252655 discloses a ballpoint pen that can draw a thick and thin writing line according to a writing angle by the action of an outer. JP-A No. 2012-148423 discloses a ballpoint pen using a resin for a ball receiving seat and to which a metal cover is attached. JP-A No. 2001-113874 discloses a ballpoint pen using an ink conduit core made of a resin for a ball receiving seat. JP-A No. 2019-10843 discloses a ballpoint pen in which a support member having a resilient action is attached to a rear end of a cylindrical receiving seat member inserted into a cylindrical body holding a ball. JP-A No. 2019-10844 discloses a ballpoint pen in which a ball is pressed in a distal direction by a spring.

SUMMARY OF INVENTION

Technical Problem

An object of an embodiment of the present disclosure is to provide a ballpoint pen refill and a ballpoint pen capable of securing sufficient ball holding force and drawing line representation like a writing brush while forming a ball receiving seat and a pressing member for pressing in a distal direction as a single member.

Solution to Problem

A first aspect of the present application is a ballpoint pen refill including: an ink storage tube made of a synthetic resin and storing an ink thereinside; a ball holder made of a synthetic resin and attached to a distal end of the ink storage tube; a ball pressing rod mounted inside the ball holder; and a writing ball stored in a distal end of the ball holder and having a rear end side held by the ball pressing rod, in which the ball pressing rod includes: a fixing portion fixed to the ball holder; a movable portion slidable in a front-rear direction with respect to the ball holder; a compression portion connecting the fixing portion and the movable portion; and a rearward movement restricting portion protruding from a distal end of the fixing portion and provided with a gap from a rear end of the compression portion.

According to the configuration of the first aspect of the present application, the ball pressing rod can serve as both a ball receiving seat and a spring enabling the writing ball to slide forward and backward.

In a second aspect of the present application, in addition to the configuration of the first aspect, the compression portion has a bellows shape. With this configuration, the ball pressing rod can be easily formed by injection molding of a synthetic resin, and a resilient force can be secured by the bellows shape.

In a third aspect of the present application, in addition to the configuration of the first aspect or the second aspect, a slit is formed rearward from the distal end of the ball holder.

In a fourth aspect of the present application, in addition to the configuration of any one of the first aspect to the third aspect, all members thereof, except the ink, are made of a synthetic resin. With this configuration, since a metal material is not used for the ballpoint pen refill, it is not necessary to dispose of the ballpoint pen refill separately from the metal, and it is easy to recycle the members.

A ballpoint pen of a fifth aspect of the present application stores the ballpoint pen refill of any one of the first aspect to the fourth aspect in a shaft tube.

Advantageous Effects of Invention

Since the embodiment of the present disclosure is configured as described above, it is possible to provide a ballpoint pen refill and a ballpoint pen capable of securing sufficient ball holding force and drawing line representation like a writing brush while forming a ball receiving seat and a pressing member for pressing in a distal direction as a single member.

DESCRIPTION OF EMBODIMENTS

Figure 1A:
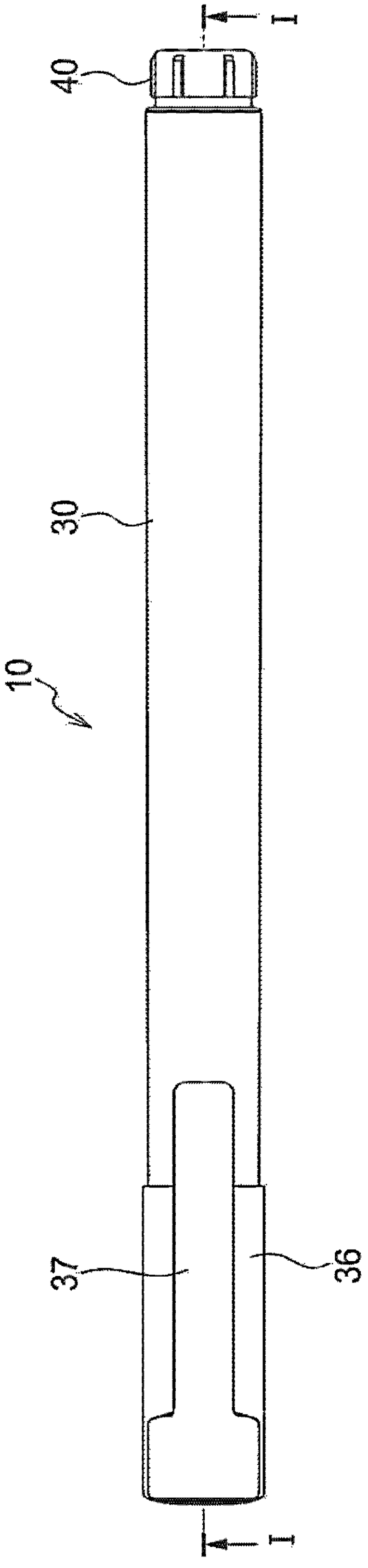
FIG. 1A is a front view illustrating a ballpoint pen of an embodiment.

Hereinafter, an embodiment of the disclosure will be described with reference to the drawings. In the following description, a "distal end" refers to a side on which a writing ball is provided in a ballpoint pen, and a "rear end" refers to an opposite side thereof. Moreover, the same reference numerals in the drawings indicate the same members or parts without any particular reference in the following description of the drawings. In each drawing, the left side of the drawing is the distal end side and the bottom surface side, and the right side is the rear end side and the plane side.

(1) First Embodiment

<Appearance>

Figure 1B:
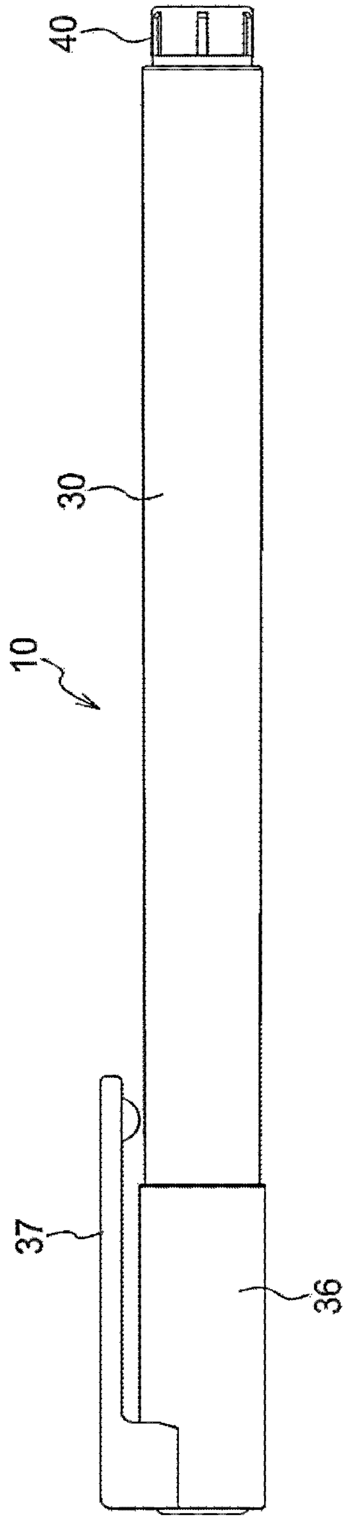
FIG. 1B is a side view illustrating the ballpoint pen of the embodiment.
Figure 1C:
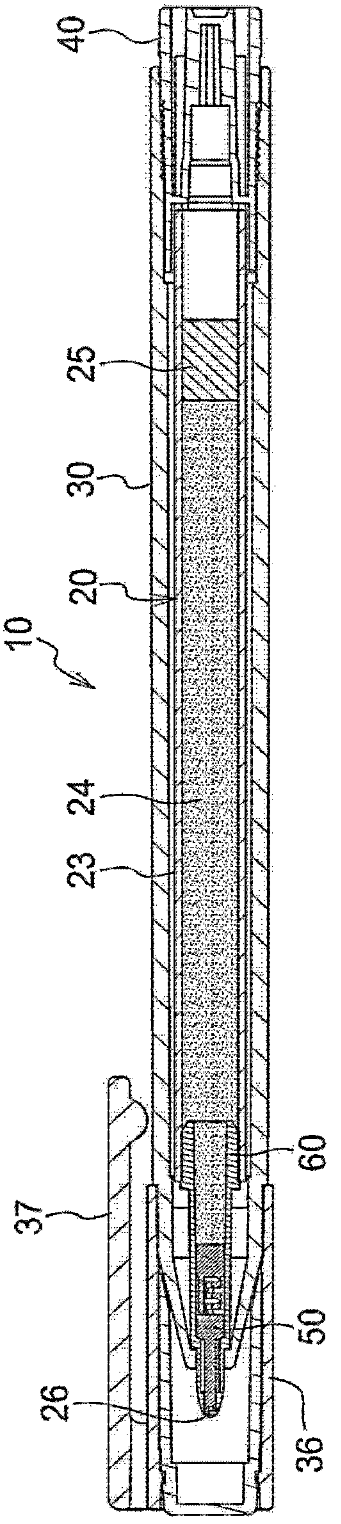
FIG. 1C is a cross-sectional view illustrating the ballpoint pen of the embodiment taken along line I-I in FIG. 1A.

A ballpoint pen 10 of a first embodiment is illustrated in a front view (FIG. 1A), a side view (FIG. 1B), and a cross-sectional view taken along line I-I in FIG. 1A (FIG. 1C). As illustrated in these drawings, the ballpoint pen 10 of this embodiment has an appearance in which a cap 36 including a clip 37 is attached to a distal end of a shaft tube 30 to which a tail plug 40 is attached at a rear end. The shaft tube 30, the tail plug 40, and the cap 36 are all formed of a synthetic resin such as polycarbonate.

As illustrated in the cross-sectional view of FIG. 1C, in the ballpoint pen 10 of this embodiment, a ballpoint pen refill 20 storing an ink 24 is incorporated in the shaft tube 30, and a rear end of this ballpoint pen refill 20 is supported in contact with the tail plug 40. In this ballpoint pen refill 20, a ball holder 60 is attached to a distal end of an ink storage tube 23 storing the ink 24. A writing ball 26 is held at a distal end of this ball holder 60. Moreover, a ball pressing rod 50 biasing the writing ball 26 in the distal direction is mounted inside the ball holder 60, and a structure thereof will be described below. Furthermore, a grease-like follower 25 is injected at the rear end of the ink 24 stored in the ballpoint pen refill 20. The ink 24 and the follower 25 will be described in detail below. Moreover, the shaft tube 30 has a cylindrical shape in which a distal end part is formed to be tapered, and a distal end part of the ball holder 60 protrudes from an opening portion provided at the distal end.

<Ballpoint Pen Refill 20>

Figure 2A:
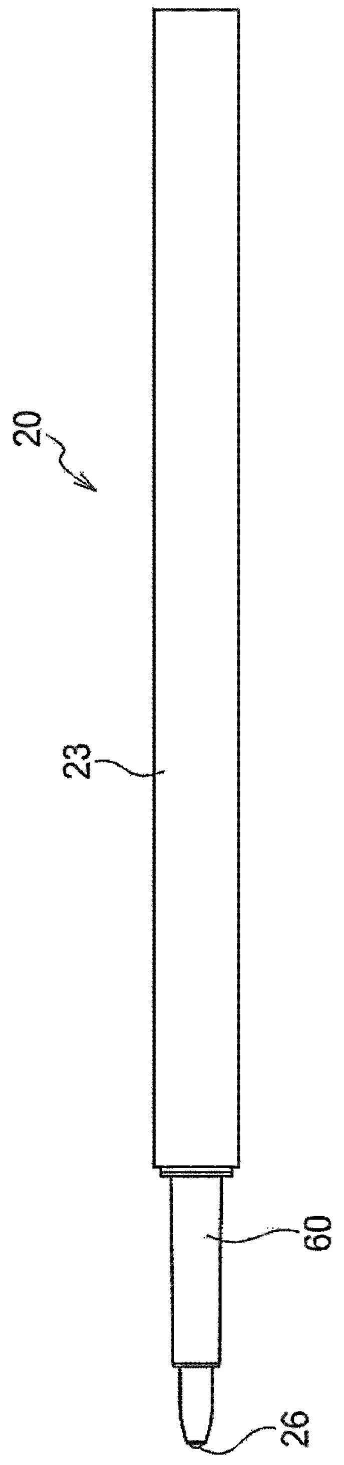
FIG. 2A is a front view illustrating a ballpoint pen refill used in the ballpoint pen of a first embodiment in FIG. 1A to FIG. 1C.
Figure 2B:
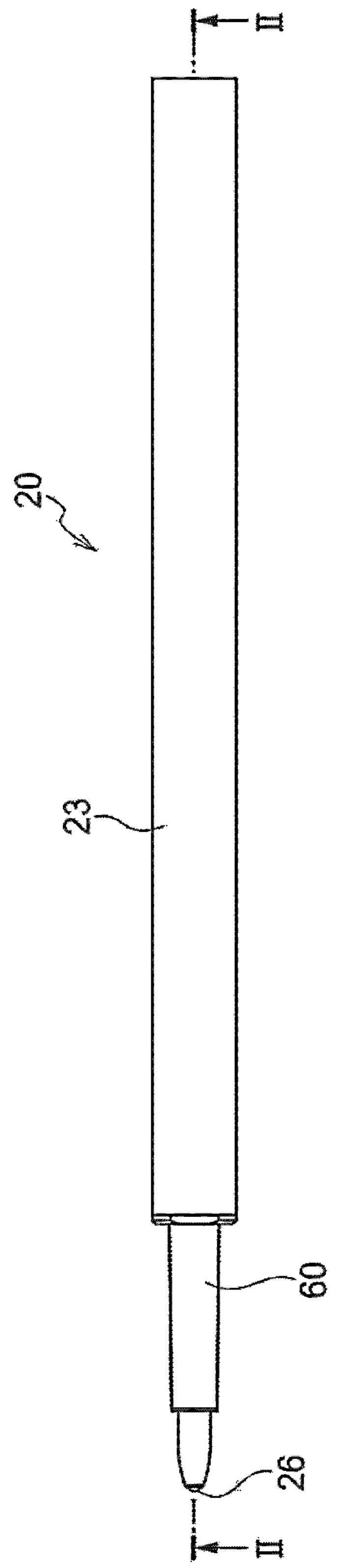
FIG. 2B is a side view illustrating the ballpoint pen refill used in the ballpoint pen of a first embodiment in FIG. 1A to FIG. 1C.
Figure 2C:
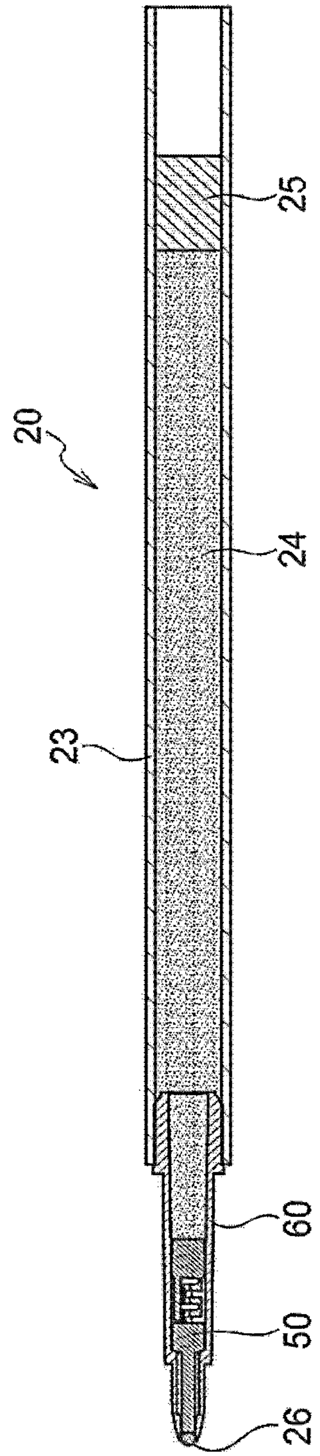
FIG. 2C is a cross-sectional view illustrating the ballpoint pen refill used in the ballpoint pen of a first embodiment in FIG. 1A to FIG. 1C taken along line II-II in FIG. 2B.

The ballpoint pen refill 20 used in the ballpoint pen 10 in FIG. 1A to FIG. 1C is illustrated in a front view (FIG. 2A), a side view (FIG. 2B), and a cross-sectional view taken along line II-II in FIG. 2B (FIG. 2C). As described above, the ballpoint pen refill 20 has an appearance in which the ball holder 60 holding the writing ball 26 made of a synthetic resin such as polyacetal or polyether ether ketone is attached to the distal end of the cylindrical ink storage tube 23 made of a synthetic resin. The ballpoint pen refill 20 in FIG. 2A to FIG. 2C shows a state in which writing pressure is not applied to the writing ball 26.

As illustrated in the cross-sectional view of FIG. 2C, the writing ball 26 is held at the distal end of this ball holder 60. Moreover, the ball pressing rod 50 biasing the writing ball 26 in the distal direction is mounted inside the ball holder 60. Furthermore, the ink 24 is stored in the ink storage tube 23 as described above.

<Ink 24>

The ink 24 of this embodiment is an aqueous gel ink. This ink 24 preferably contains a coloring pigment, a polyvinyl alcohol-based resin as a dispersion resin, and an alkali swelling associative thickener. Each component will be described below.

As the coloring pigment, either an inorganic coloring pigment or an organic coloring pigment can be used. Specifically, black pigments such as carbon black; red pigments such as permanent carmine FB, Lake Red C, Permanent Red FGR, and Fast Red; blue pigments such as phthalocyanine blue, fast sky blue, and ultramarine blue, and mixtures thereof can be used.

As the carbon black typically used as the coloring pigment of the ink, a commercially available carbon black, a carbon black for rubber, or the like can be used, but a commercially available carbon black for a black colorant of an ink, a paint, or the like is preferable. As the type of carbon black, any of channel black, furnace black, acetylene black, thermal black, and the like can be used. The particle size of the carbon black is preferably from 10 to 80 nm. As the surface property of the carbon black, any of acidic, neutral, and alkaline can be used, but carbon black having a pH of from 7.5 to 8.5 is preferably used.

The content of the coloring pigment varies depending on the type of the coloring pigment, but is preferably from 8 to 25% by weight with respect to the total amount of the ink. In a case in which the content is less than 8% by weight, coloring becomes insufficient in relation to the amount of the dispersion resin, and the quality of the color of the drawn line cannot be satisfied. On the other hand, in a case in which the content is more than 25% by weight, it is necessary to increase the amount of the polyvinyl alcohol-based resin required for stably dispersing the coloring pigment, and as a result, the viscosity is high and the writing feeling is heavy.

The polyvinyl alcohol-based resin as a dispersion resin is contained as a water-soluble resin for uniformly dispersing a coloring pigment such as carbon black in water and as a fixing agent to paper.

The polyvinyl alcohol-based resin may be one obtained by saponifying polyvinyl acetate, and is preferably a polyvinyl alcohol having a polymerization degree of from 300 to 2000 and a saponification degree of from 80 to 95 mol %. In a case in which the polymerization degree is too low, the viscosity of the ink may be too low, and there is a concern that the blobbing of the ink cannot be sufficiently suppressed even in the case of being used in combination with an alkali swelling associative thickener. In a case in which the saponification degree is too low, the water resistance of the drawn line is deteriorated.

The polyvinyl alcohol-based resin used in this embodiment is not limited to a saponified product of polyvinyl acetate of 100% vinyl acetate, and a polyvinyl alcohol-based copolymer obtained by copolymerizing another vinyl-based monomer or a polyvinyl alcohol-based resin modified after acetylation or the like may be used as long as the content thereof is about 10 mol % or less, but a saponified product of polyvinyl acetate of 100% vinyl acetate is preferable. The content of the polyvinyl alcohol-based resin is preferably from 2 to 10% by weight with respect to the total amount of the ink. In a case in which the content is less than 2% by weight, the dispersion of the coloring pigment is not sufficiently stabilized, and the storage stability is deteriorated, for example, the coloring pigment settles over time. In a case in which the content is more than 10% by weight, the viscosity increases too much and the writing feeling becomes heavy.

The alkali swelling associative thickener can impart thixotropic behavior to the ink. In other words, even in a case in which the ink in a resting state has a high viscosity, the viscosity is reduced by applying a high shearing force at the time of writing, and writing becomes possible.

Examples of the alkali swelling associative thickener include, among alkali swelling type thickeners which are unneutralized acrylic polymers, water-soluble or water-swellable polymers modified with a hydrophobic group, and aqueous solutions and emulsions thereof, and hydrophobically modified alkali-soluble emulsions, hydrophobically modified poly(meth)acrylic acids, (meth)acrylic acid copolymers, mixtures thereof, and aqueous solutions and emulsions thereof. Examples of the hydrophobic group include a chain or cyclic hydrocarbon group, an aromatic hydrocarbon group, a halogenated alkyl group, an organosilicon group, and a fluorocarbon group, and the modification with a hydrophobic group can be performed by esterification with a hydrophobic chain transfer agent (for example, dodecyl mercaptan), a hydrophobic monomer (for example, decyl methacrylate or a nonionic vinyl monomer), a hydrophobic group-containing alcohol (for example, dodecanol), and a nonionic surfactant, or the like. The alkali swelling associative thickener having the configuration as described above is neutralized with an alkali to form a network structure, and spreads in a dispersion medium while swelling to thicken the ink. Furthermore, hydrophilic groups or hydrophobic groups in the molecule, and further, a hydrophilic group or hydrophobic group and a dispersion resin can be associated with each other by formation of a hydrogen bond or the like. Although the viscosity is increased by association, the association state is broken by a high shearing force, and the viscosity decreases, so that good fluidity can be exhibited.

As described above, the thixotropy can be imparted to the ink by adding the alkali swelling associative thickener. Specifically, a thixotropy index (TI value) represented by a ratio ($\eta 0.6/\eta 6$) of the viscosity ($\eta 0.6$) at 0.6 rpm to the viscosity ($\eta 6$) at 6 rpm as measured with a rotary viscometer can be set to 3.0 or more by adding the alkali swelling associative thickener. The TI value is preferably about from 3.0 to 10. It is preferable that the thixotropy index is within the above range and the viscosity at 6 rpm is 0.3 Pa·s or more. By adjusting the contents of the coloring pigment and the polyvinyl alcohol-based resin, the thixotropy index can be adjusted within the above range, but the thickening effect is insufficient, and in a case in which the viscosity at 6 rpm is too low, the viscosity at rest is low, and consequently, the blobbing of the ink cannot be sufficiently prevented. In this respect, the addition of the alkali swelling associative thickener makes it possible to increase the viscosity and impart the thixotropy so as to satisfy both the blobbing prevention of the ink and the writing property. On the other hand, even in a case in which the viscosity is increased by adjusting the addition amount of the alkali swelling associative thickener, the viscosity of the ink at a rotation speed of 6 rpm as measured with an EM type rotary viscometer can be set to less than 25 Pa·s. By increasing the viscosity in a range of less than 25 Pa·s in a state in which a shearing force is applied, it is possible to prevent the blobbing of the ink due to an increase in viscosity without impairing the writing property.

Note that examples of the associative thickener include a urethane block copolymer aqueous solution modified with a urethane monomer or the like. The urethane associative thickener can also impart thixotropy in which the association and separation of molecules are repeated depending on the magnitude of the shearing force, but the viscosity increase level is insufficient or the viscosity decrease under a high shearing force is insufficient.

The content of the alkali swelling associative thickener is preferably from 0.1 to 5.0% by weight with respect to the total amount of the ink. In a case in which the content is less than 0.1% by weight, imparting of thixotropy becomes insufficient. In a case in which the content is more than 5.0% by weight, the viscosity increases too much and the writing property deteriorates.

In the ink of this embodiment, in order for the alkali swelling associative thickener to effectively impart thixotropy, it is preferable that the ink is neutral to alkaline, specifically, has a pH of from 7.0 to 9.5.

Therefore, an alkaline compound may be added in order to set the pH of the ink within the above range. As the alkaline compound, triethanolamine, monoethanolamine, diethanolamine, ammonia, and the like can be used.

The ink of this embodiment may further contain additives such as a dispersion stabilizing aid, a surfactant, an antiseptic, and an antifoaming agent if necessary. As the dispersion stabilizing aid, ethylene glycol, diethylene glycol, triethylene glycol, glycerin, and the like are preferably used.

The ink containing components as described above has thixotropy. Specifically, it is preferable that the thixotropy index (TI value) represented by the ratio ($\eta 0.6/\eta 6$) of the viscosity ($\eta 0.6$) at 0.6 rpm to the viscosity ($\eta 6$) at 6 rpm as measured with an EM type rotary viscometer is 3.0 or more, and the viscosity at 6 rpm is 0.3 Pa·s or more. The thixotropy index is more preferably 3.5 or more. Moreover, the viscosity at 6 rpm is more preferably 0.5 Pa·s or more.

The viscosity measured with a rotary viscometer at a rotation speed of 6 rpm is preferably 25 Pa·s or less. The viscosity is a value at a rotation speed of 100 rpm and 25° C. in an EM type rotary viscometer.

As illustrated in FIG. 2C, the grease-like follower 25 is injected on the rear end side of the ink 24 in order to prevent the ink 24 from flowing out from the rear end of the ink storage tube 23. This follower 25 follows the distal direction as the ink 24 is consumed by writing. A cylindrical float made of a synthetic resin adjusted to have the same specific gravity as the follower 25 may be floated in the follower 25.

<Ball Holder 60>

Figure 3:
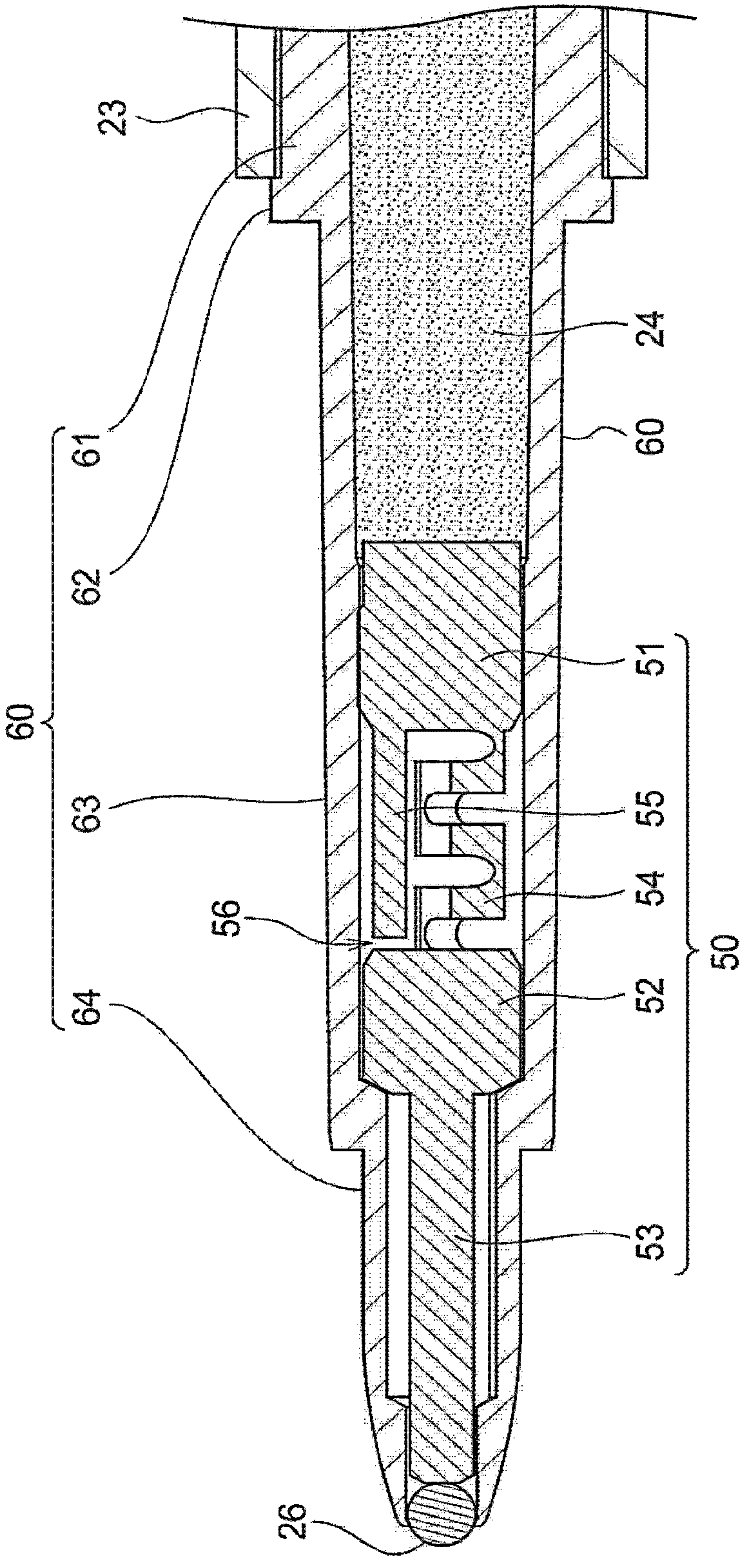
FIG. 3 is an enlarged view of a distal end part in FIG. 2C.

FIG. 3 is an enlarged view of a distal end part in FIG. 2C. The ball holder 60 is attached to the distal end of the ink storage tube 23 and holds the writing ball 26 at the distal end. The ball pressing rod 50 biasing the writing ball 26 in the distal direction is mounted inside the ball holder 60.

Figure 4A:
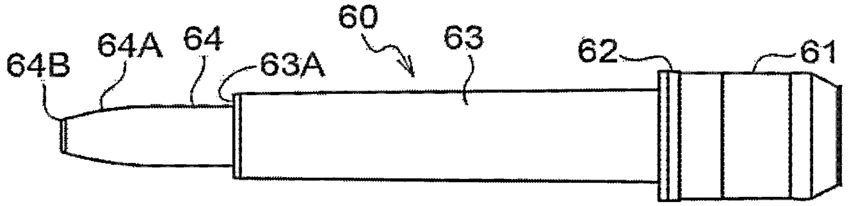
FIG. 4A is a front view of a ball holder used in the ballpoint pen refill in FIG. 2A to FIG. 2C.
Figure 4B:
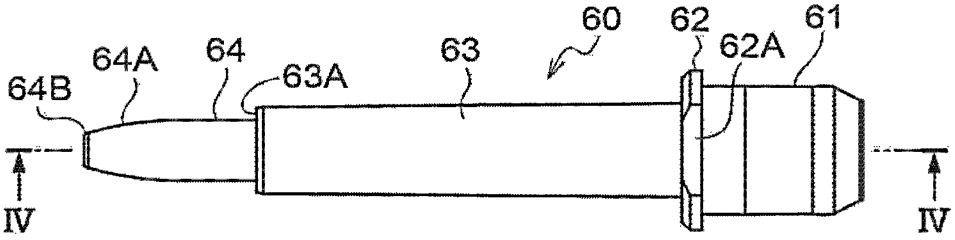
FIG. 4B is a side view illustrating the ball holder used in the ballpoint pen refill in FIG. 2A to FIG. 2C.
Figure 4C:
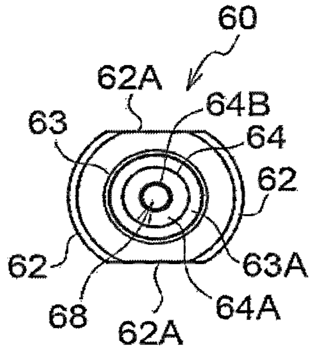
FIG. 4C is a bottom view illustrating the ball holder used in the ballpoint pen refill in FIG. 2A to FIG. 2C.
Figure 4D:
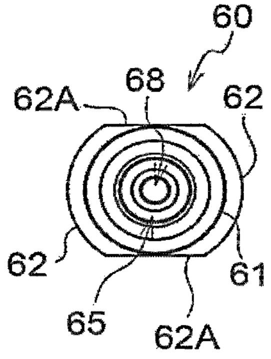
FIG. 4D is a plan view illustrating the ball holder used in the ballpoint pen refill in FIG. 2A to FIG. 2C.
Figure 4E:
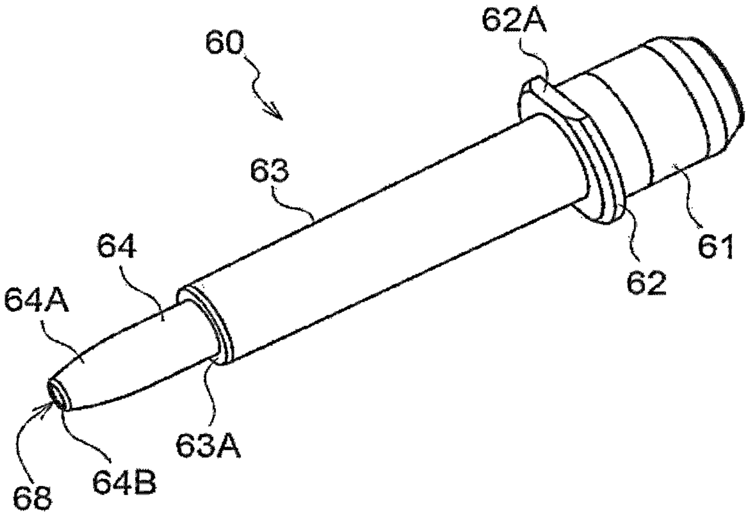
FIG. 4E is a distal end side perspective view illustrating the ball holder used in the ballpoint pen refill in FIG. 2A to FIG. 2C.
Figure 4F:
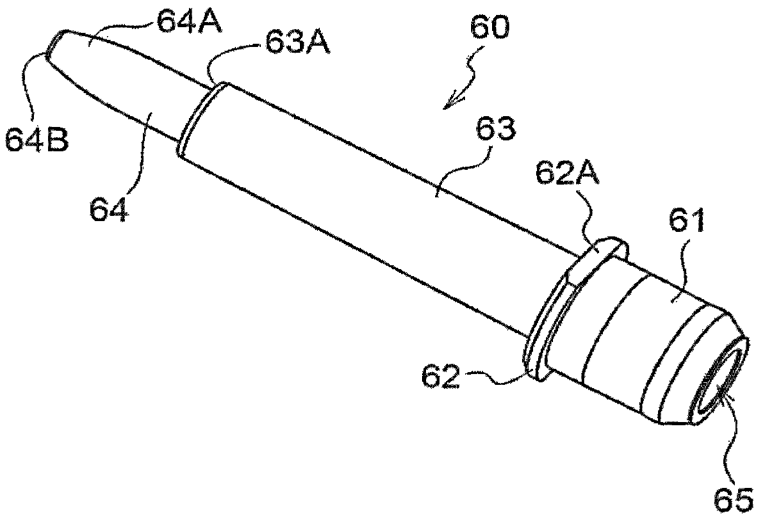
FIG. 4F is a rear end side perspective view illustrating the ball holder used in the ballpoint pen refill in FIG. 2A to FIG. 2C.
Figure 4G:
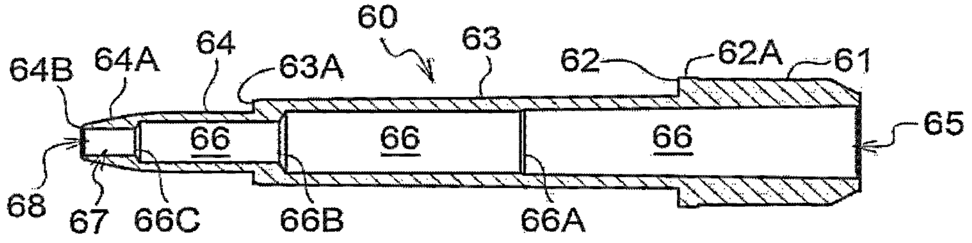
FIG. 4G is a cross-sectional view illustrating the ball holder used in the ballpoint pen refill in FIG. 2A to FIG. 2C taken along line IV-IV in FIG. 4B.

The ball holder 60 used in the ballpoint pen refill 20 in FIG. 2A to FIG. 2C and FIG. 3 is illustrated in a front view (FIG. 4A), a side view (FIG. 4B), a bottom view (FIG. 4C), a plan view (FIG. 4D), a distal end side perspective view (FIG. 4E), a rear end side perspective view (FIG. 4F), and a cross-sectional view taken along line IV-IV in FIG. 4B (FIG. 4G). The ball holder 60 is made of, for example, a synthetic resin such as polyacetal or polyether ether ketone, and also as illustrated in FIG. 3, includes an attachment portion 61, a flange portion 62, an intermediate portion 63, and a distal end portion 64 from a rear end side.

The attachment portion 61 has a substantially cylindrical shape, and is a portion press-fitted to the distal end of the ink storage tube 23 as illustrated in FIG. 3. A rear end opening 65 which is an opening communicating with the inside is formed at the rear end of the attachment portion 61. Moreover, the flange portion 62 is a disk-shaped portion that expands in diameter on the distal end side of the attachment portion 61, and is a portion that comes into contact with the distal end of the ink storage tube 23 to prevent further press-fitting in a case in which the attachment portion 61 is press-fitted into the distal end of the ink storage tube 23. A surface cut portion 62A having a shape scraped in a planar shape is formed on both right and left sides of the flange portion 62. This surface cut portion 62A is a portion gripped by a tool in a case in which the ball holder 60 is inserted into the ink storage tube 23.

The intermediate portion 63 has a slightly tapered cylindrical shape, and an outer diameter thereof is smaller than an outer diameter of the attachment portion 61. The distal end portion 64 having a substantially cylindrical shape with a smaller outer diameter is formed on the distal end side of the intermediate portion 63. An abutment portion 63A, which is a step height between the intermediate portion 63 and the distal end portion 64, abuts on the inside of the distal end opening of the shaft tube 30 in a case in which the ballpoint pen refill 20 is attached to the shaft tube 30 (see FIG. 1C). Moreover, a distal end side part of the distal end portion 64 is a tapered portion 64A formed to be tapered, and a periphery of a distal end opening 68, which is an opening portion provided at the distal end, is a caulking portion 64B whose diameter is reduced inward.

The inside of the ball holder 60 has a hollow structure as illustrated in FIG. 4G. This hollow structure includes a back hole 66 whose inner diameter gradually decreases in the distal direction from the rear end opening 65, and an ink hole 67 connecting the back hole 66 and the distal end opening 68. The back hole 66 is gradually reduced in diameter at a rear reduced diameter portion 66A, which is a step height near the middle of the intermediate portion 63, and an intermediate reduced diameter portion 66B, which is a step height near the distal end of the intermediate portion 63. Moreover, from the back hole 66 to the ink hole 67, the diameter is gradually reduced at a distal end reduced diameter portion 66C which is a step height therebetween. That is, the ball holder 60 penetrates from the rear end opening 65 to the distal end opening 68 through the back hole 66 and the ink hole 67.

Figure 5A:
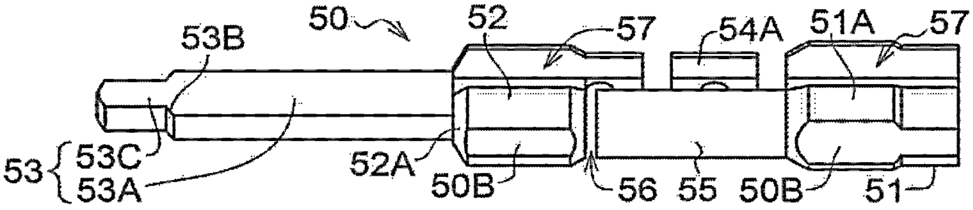
FIG. 5A is a front view illustrating a ball pressing rod used in the ballpoint pen refill in FIG. 2A to FIG. 2C.
Figure 5B:
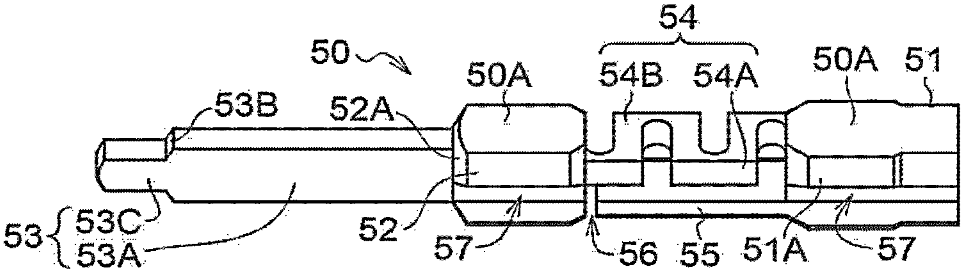
FIG. 5B is a left side view illustrating the ball pressing rod used in the ballpoint pen refill in FIG. 2A to FIG. 2C.
Figure 5C:
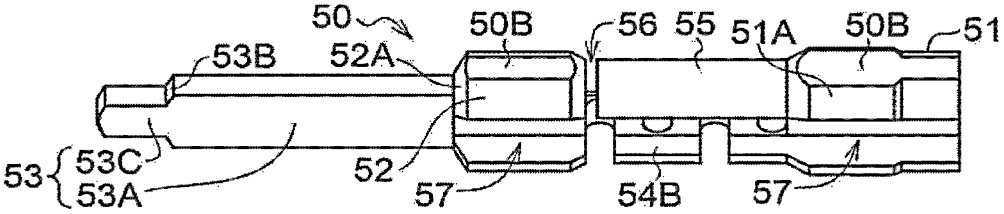
FIG. 5C is a right side view illustrating the ball pressing rod used in the ballpoint pen refill in FIG. 2A to FIG. 2C.
Figure 5D:
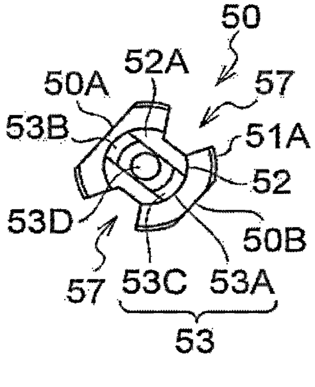
FIG. 5D is a bottom view illustrating a ball pressing rod used in the ballpoint pen refill in FIG. 2A to FIG. 2C.
Figure 5E:
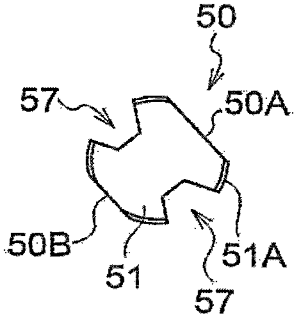
FIG. 5E is a plan view illustrating a ball pressing rod used in the ballpoint pen refill in FIG. 2A to FIG. 2C.
Figure 5F:
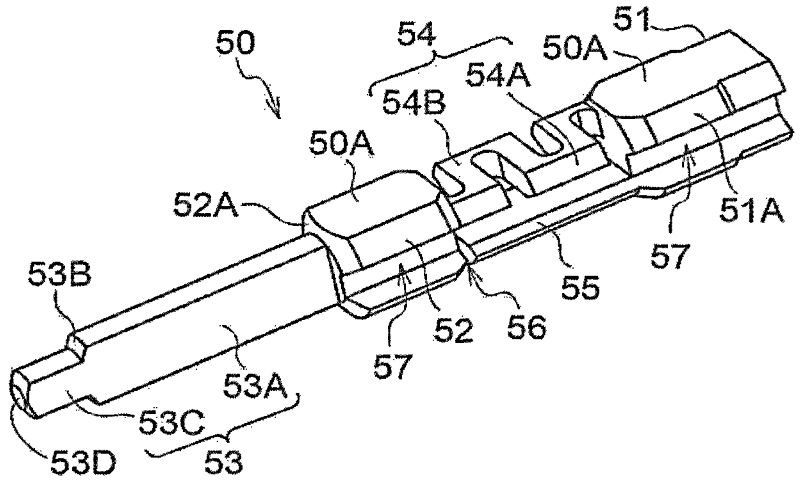
FIG. 5F is a distal end side perspective view illustrating a ball pressing rod used in the ballpoint pen refill in FIG. 2A to FIG. 2C.
Figure 5G:
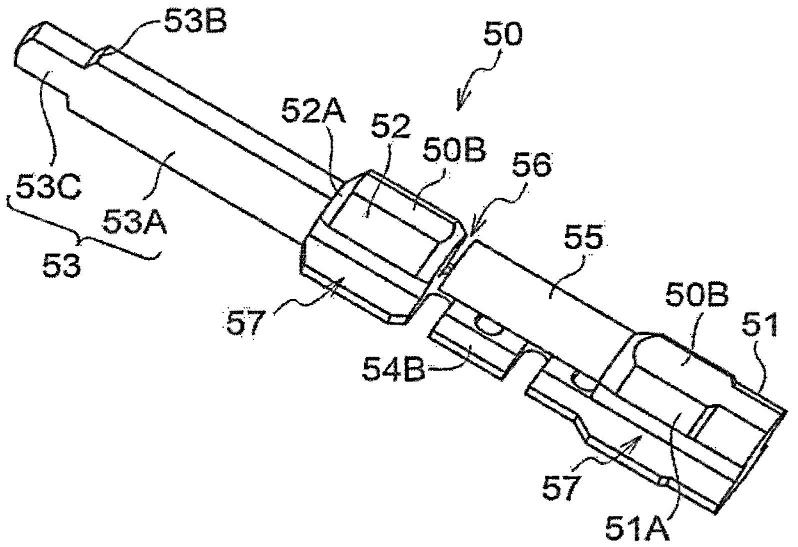
FIG. 5G is a rear end side perspective view illustrating a ball pressing rod used in the ballpoint pen refill in FIG. 2A to FIG. 2C.

The ball pressing rod 50 mounted inside the ball holder 60 is illustrated in a front view (FIG. 5A), a left side view (FIG. 5B), a right side view (FIG. 5C), a bottom view (FIG. 5D), a plan view (FIG. 5E), a distal end side perspective view (FIG. 5F), and a rear end side perspective view (FIG. 5G). The ball pressing rod 50 includes a fixing portion 51, a movable portion 52 including a pressing portion 53, a compression portion 54 interposed between the fixing portion 51 and the movable portion 52, and a rearward movement restricting portion 55 protruding from the fixing portion 51 in the distal direction.

Although each of the fixing portion 51, the compression portion 54, and the movable portion 52 has a substantially columnar shape, two opposing surfaces are formed as a large flat surface portion 50A and a small flat surface portion 50B that are scraped in a planar shape, and a groove-shaped ink groove 57 is formed in each of the other opposing two surfaces to have a planar shape as illustrated in FIG. 5E. The area of the large flat surface portion 50A is larger than the area of the small flat surface portion 50B.

The fixing portion 51 is a portion fixed to the ball holder 60 in a case in which the ball pressing rod 50 is attached to the ball holder 60 by press-fitting a press-fitting portion 51A having a larger diameter into a front part of the rear reduced diameter portion 66A (see FIG. 4G) of the back hole 66 (see FIG. 3). The movable portion 52 is a portion slidable in the front-rear direction relative to the ball holder 60. A rear contact portion 52A, which is a front end edge of the movable portion 52, is a portion that comes into contact with the intermediate reduced diameter portion 66B (see FIG. 4G) of the back hole 66 in a case in which the ball pressing rod 50 is attached to the ball holder 60 (see FIG. 3).

The pressing portion 53 protruding from the movable portion 52 in the distal direction includes a wide portion 53A, which is a portion coming into contact with the rear end of the writing ball 26 in a case in which the ball pressing rod 50 is attached to the ball holder 60 (see FIG. 3), is positioned on the rear side, and is wider, and a narrow portion 53C which is positioned on the front side and is narrow. Moreover, a step height between the wide portion 53A and the narrow portion 53C is a front contact portion 53B. The front contact portion 53B is a portion that comes into contact with the distal end reduced diameter portion 66C (see FIG. 4G) of the back hole 66 in a case in which the ball pressing rod 50 is attached to the ball holder 60. Furthermore, in a state in which the front contact portion 53B is in contact with the distal end reduced diameter portion 66C, the narrow portion 53C is positioned inside the ink hole 67, and a ball pressing surface 53D provided at the distal end thereof comes into contact with the rear end of the writing ball 26 (see FIG. 3). In other words, the rear end side of the writing ball 26 is held by the pressing portion 53 of the ball pressing rod 50.

The compression portion 54 connects the fixing portion 51 and the movable portion 52 to each other in a shape bent twice in a bellows shape. A bent part on the rear side is a rear bent portion 54A, and a bent part on the front side is a front bent portion 54B. Moreover, the rearward movement restricting portion 55 has a plate-like shape extending from the fixing portion 51 toward the movable portion 52, and in a state in which the ball pressing rod 50 is attached to the ball holder 60 and writing pressure is not applied to the writing ball 26, a gap is generated between the rearward movement restricting portion 55 and the movable portion 52 (see FIG. 3). This gap is a rearward movement gap 56 as a range in which the movable portion 52 can move rearward.

As illustrated in FIG. 2C and FIG. 3, the ink 24 stored in the ink storage tube 23 passes through the ink hole 67 from the back hole 66 of the ball holder 60, reaches the writing ball 26, and is transferred to the writing surface at that point to form a drawn line. At this time, since the ink groove 57, the large flat surface portion 50A, and the small flat surface portion 50B are formed in the ball pressing rod 50 mounted inside the ball holder 60, and the pressing portion 53 is also formed in a flat plate shape, the ball pressing rod 50 does not block the flow of the ink 24 in the distal direction.

<Operation>

Figure 6A:
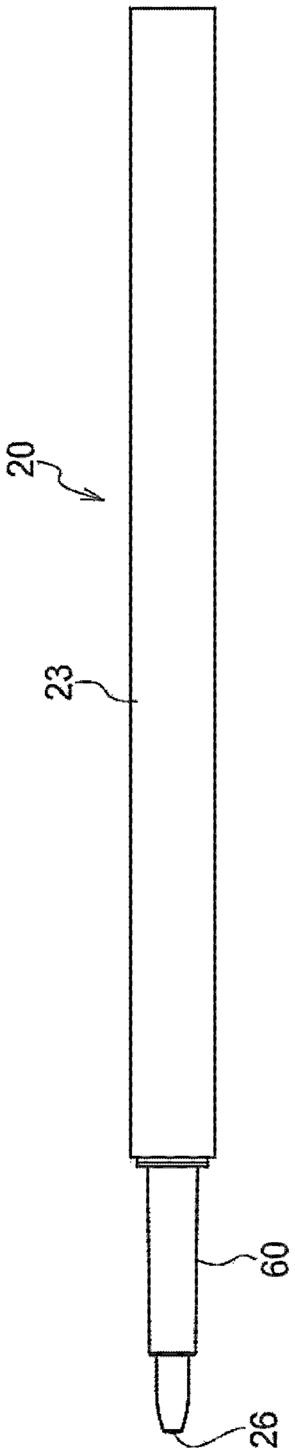
FIG. 6A is a front view illustrating a pressing state of a writing ball in the ballpoint pen refill in FIG. 2A to FIG. 2C.
Figure 6B:
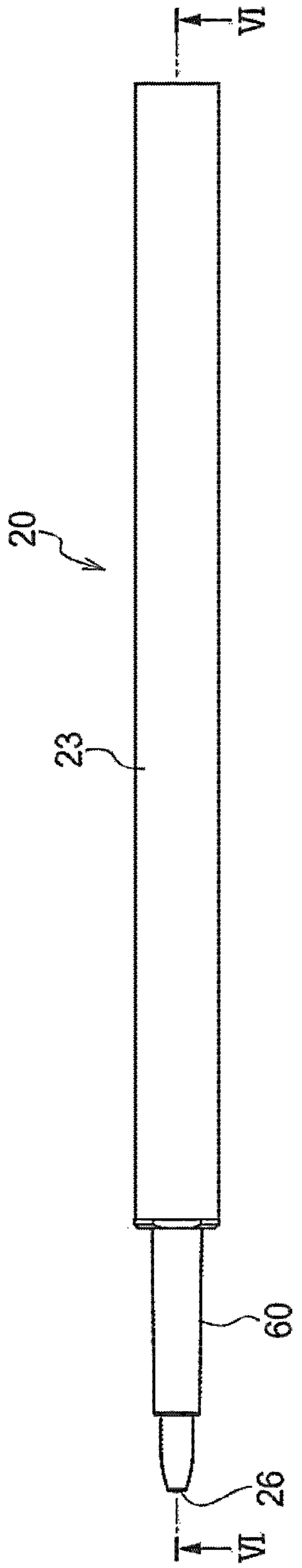
FIG. 6B is a side view illustrating the pressing state of the writing ball in the ballpoint pen refill in FIG. 2A to FIG. 2C.
Figure 6C:
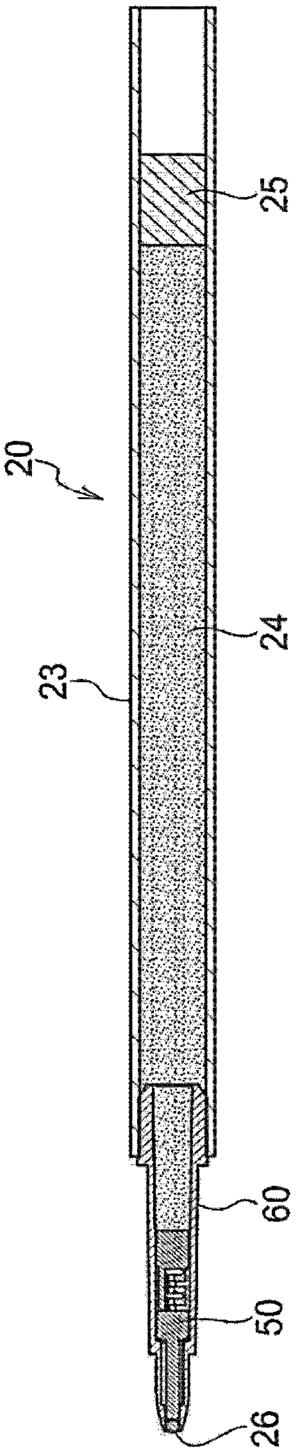
FIG. 6C is a cross-sectional view illustrating the pressing state of the writing ball in the ballpoint pen refill in FIG. 2A to FIG. 2C taken along line VI-VI in FIG. 6B.
Figure 7:
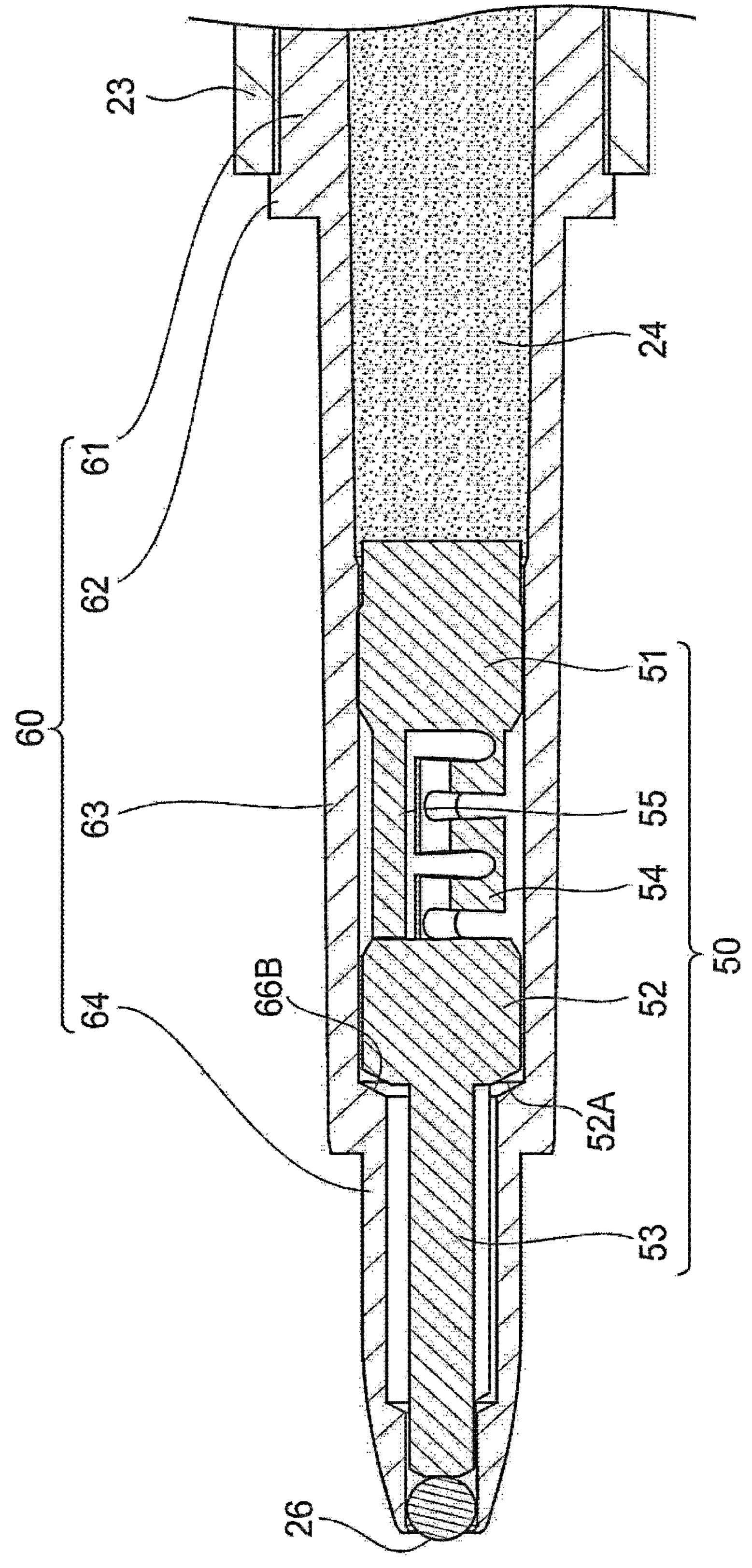
FIG. 7 is an enlarged view of a distal end part in FIG. 6C.

A pressing state in which writing pressure is applied to the writing ball 26 at the distal end of the ballpoint pen refill 20 in the state illustrated in FIG. 2A to FIG. 2C is illustrated in a front view (FIG. 6A), a side view (FIG. 6B), and a cross-sectional view taken along line VI-VI in FIG. 6B (FIG. 6C). In this state, the writing ball 26 moves rearward to the inside of the ball holder 60. Moreover, as illustrated in FIG. 7, which is an enlarged view of the distal end part in FIG. 6C, the movable portion 52 moves rearward by the pressing of the writing ball 26 due to the writing pressure, and the rear contact portion 52A of the movable portion 52 and the intermediate reduced diameter portion 66B of the back hole 66 are separated from each other. On the other hand, the movable portion 52 comes into contact with the rearward movement restricting portion 55, and the rearward movement gap 56 that is vacant in the state illustrated in FIG. 3 disappears.

Figure 8A:
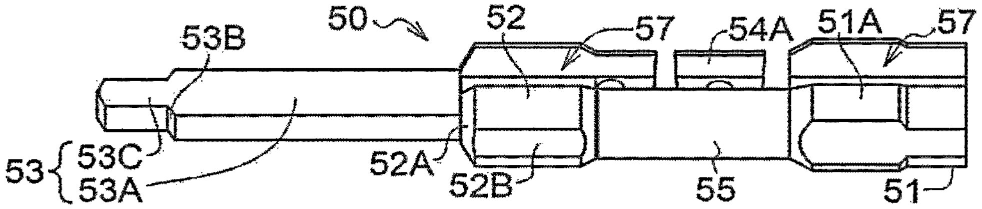
FIG. 8A is a front view illustrating a compressed state of the ball pressing rod in FIG. 5A to FIG. 5G.
Figure 8B:
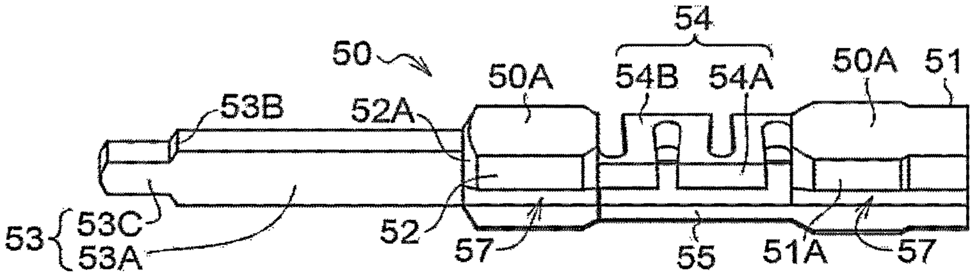
FIG. 8B is a left side view illustrating the compressed state of the ball pressing rod in FIG. 5A to FIG. 5G.
Figure 8C:
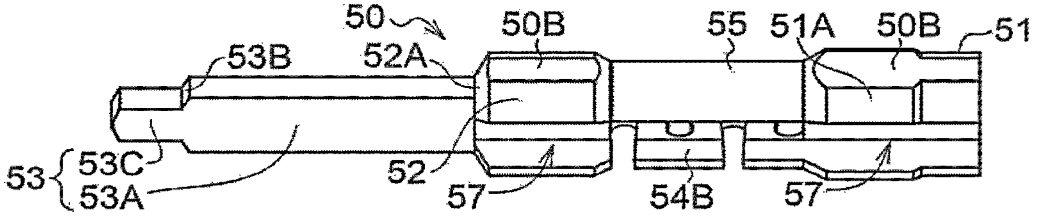
FIG. 8C is a right side view illustrating the compressed state of the ball pressing rod in FIG. 5A to FIG. 5G.
Figure 8D:
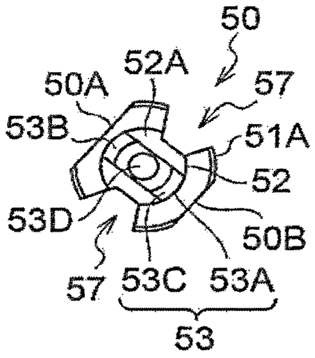
FIG. 8D is a bottom view illustrating the compressed state of the ball pressing rod in FIG. 5A to FIG. 5G.
Figure 8E:
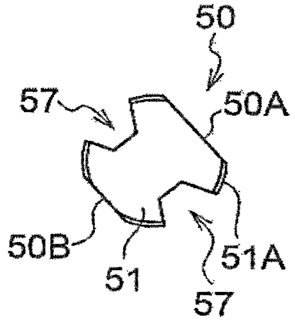
FIG. 8E is a plan view illustrating the compressed state of the ball pressing rod in FIG. 5A to FIG. 5G.
Figure 8F:
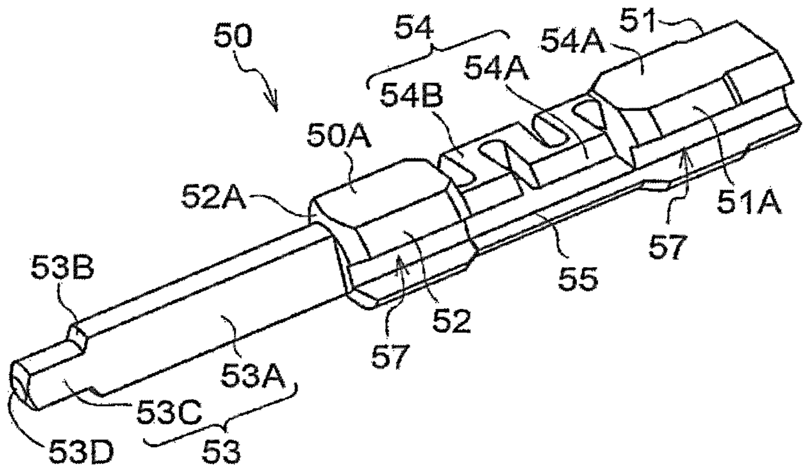
FIG. 8F is a distal end side perspective view illustrating the compressed state of the ball pressing rod in FIG. 5A to FIG. 5G.
Figure 8G:
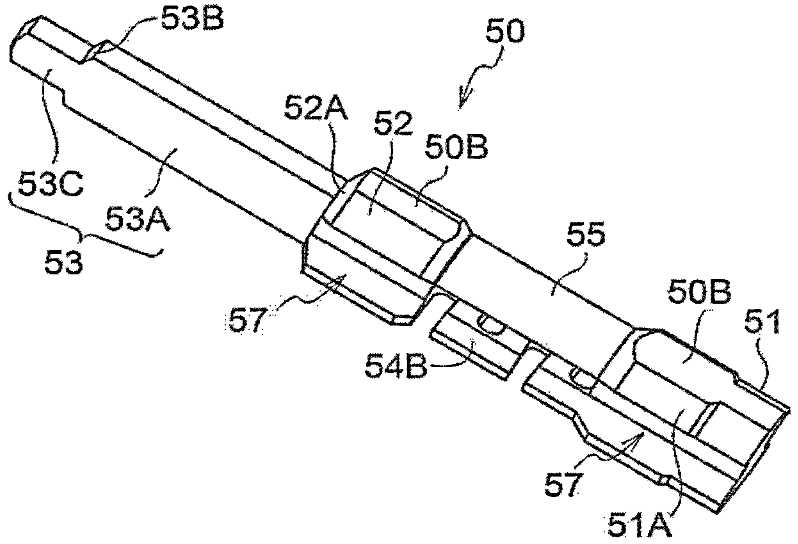
FIG. 8G is a rear end side perspective view illustrating the compressed state of the ball pressing rod in FIG. 5A to FIG. 5G.

The ball pressing rod 50 in the state illustrated in FIG. 7 is illustrated in a front view (FIG. 8A), a left side view (FIG. 8B), a right side view (FIG. 8C), a bottom view (FIG. 8D), a plan view (FIG. 8E), a distal end side perspective view (FIG. 8F), and a rear end side perspective view (FIG. 8G). As illustrated in these drawings, the compression portion 54 is bent and compressed by the rearward movement of the movable portion 52, whereby the rear end edge of the movable portion 52 and the front end edge of the rearward movement restricting portion 55 come into contact with each other, and the rearward movement gap 56 as illustrated in FIG. 5A to FIG. 5C, FIG. 5F, and FIG. 5G disappears.

As described above, the distal end edge of the rearward movement restricting portion 55 is the limit of rearward movement due to the pressing of the writing ball 26. Moreover, the intermediate reduced diameter portion 66B of the back hole 66 is the limit of forward movement of the ball pressing rod 50. Further, the writing ball 26 is constantly urged forward by the spring effect of the compression portion 54. Furthermore, in a case in which writing pressure is applied to the writing ball 26, the compression portion 54 compresses and bends through the movable portion 52, so that it is possible to give a user a writing feeling in which the pen tip bends. As a result, it is possible to achieve drawing line representation such as tome (stop), hane (upward brush-stroke), or harai (sweeping) like a hair brush.

Moreover, the ball holder 60 and the ball pressing rod 50 have a shape that can be injection molded with a synthetic resin, and a flow path of the ink inside the ball holder 60 is secured by the ink groove 57, the large flat surface portion 50A, and the small flat surface portion 50B provided in the ball pressing rod 50. Furthermore, since all the members constituting the ballpoint pen 10 except for the ink are made of a synthetic resin and do not use metal parts, it is not necessary to perform sorting at the time of disposal, and it is easy to recycle the synthetic resin material.

(2) Second Embodiment

<Appearance>

The appearance of the ballpoint pen 10 of the second embodiment is the same as that of the first embodiment as illustrated in the front view of FIG. 1A, the side view of FIG. 1B, and the cross-sectional view of FIG. 1C.

<Ballpoint Pen Refill 20>

Figure 9A:
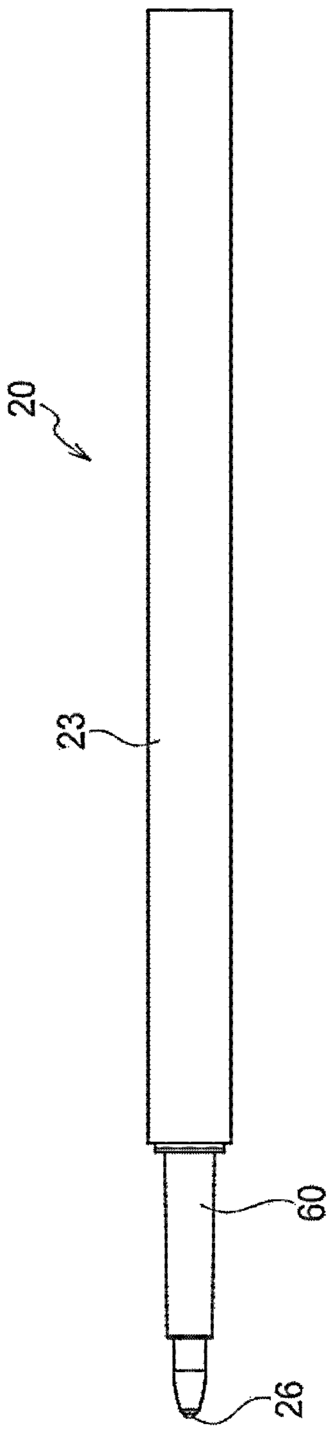
FIG. 9A is a front view illustrating a ballpoint pen refill used in a ballpoint pen of a second embodiment.
Figure 9B:
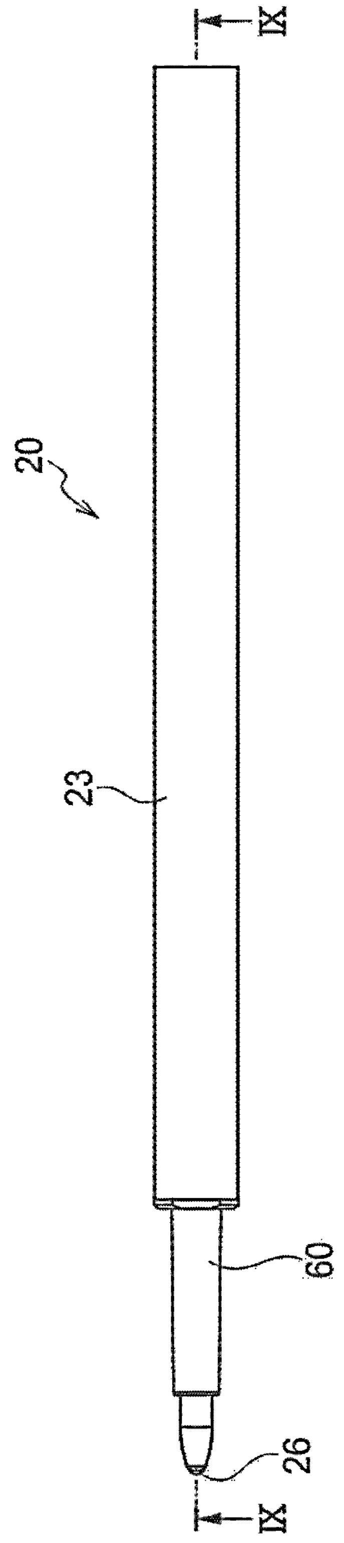
FIG. 9B is a side view illustrating the ballpoint pen refill used in the ballpoint pen of a second embodiment.
Figure 9C:
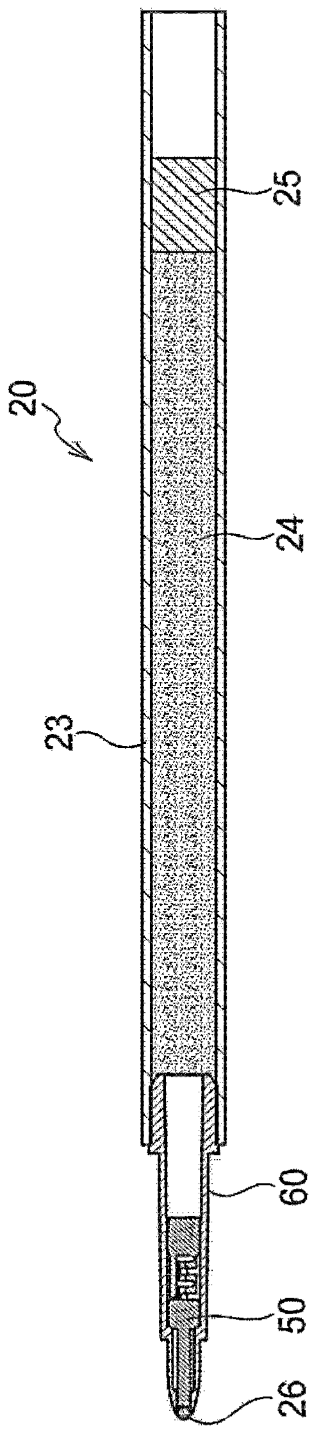
FIG. 9C is a cross-sectional view illustrating the ballpoint pen refill used in the ballpoint pen of the second embodiment taken along line IX-IX in FIG. 9B.

The ballpoint pen refill 20 used in the ballpoint pen 10 of the second embodiment is illustrated in a front view (FIG. 9A), a side view (FIG. 9B), and a cross-sectional view taken along line IX-IX in FIG. 9B (FIG. 9C). The structure of the ballpoint pen refill 20 of the second embodiment is the same as that of the first embodiment except that an extending portion 64D (see FIG. 10) described below is provided. The ink 24 is also similar to that of the first embodiment.

<Ball Holder 60>

Figure 10:
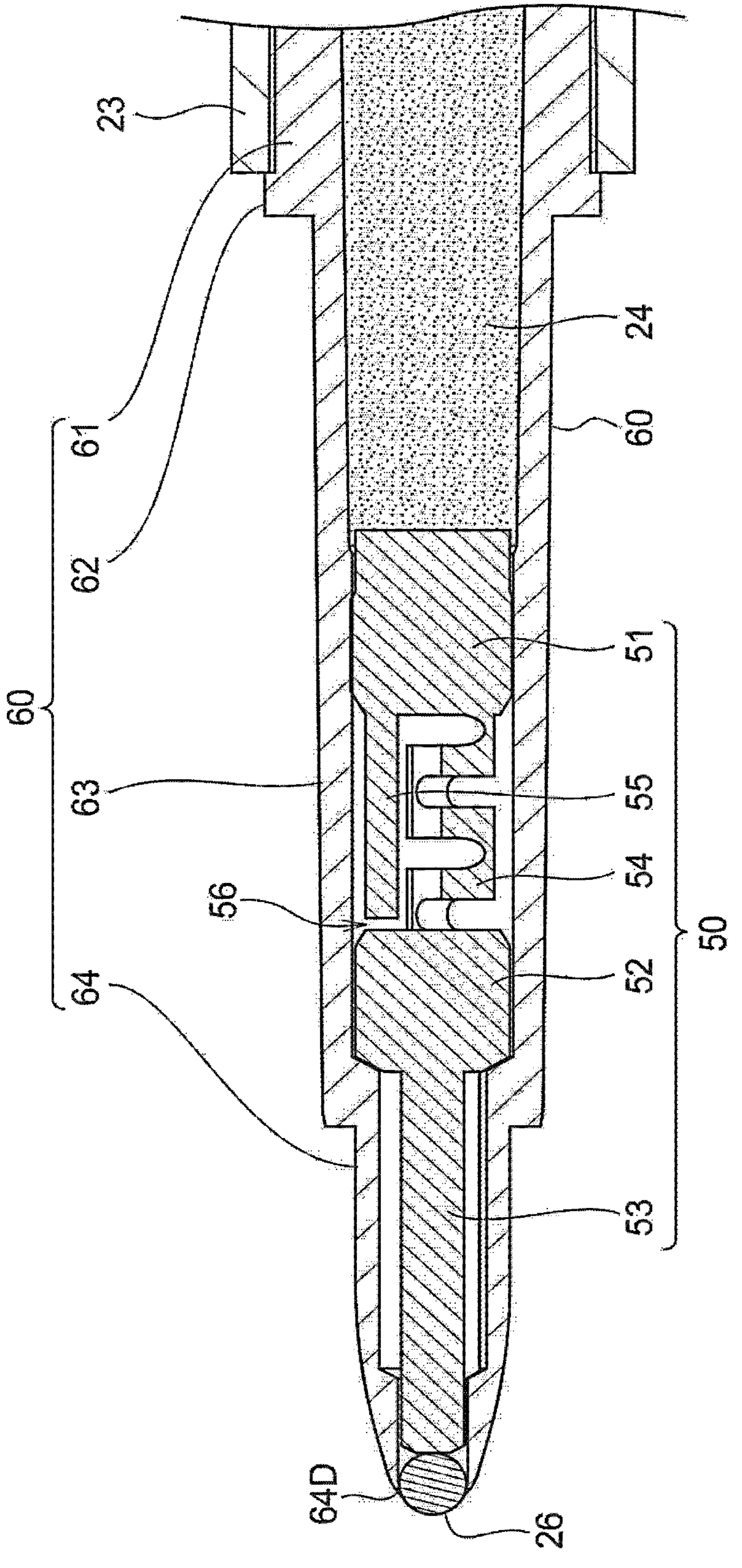
FIG. 10 is an enlarged view of a distal end part in FIG. 9C.

FIG. 10 is an enlarged view of a distal end part of FIG. 9C. The ball holder 60 is attached to the distal end of the ink storage tube 23 and holds the writing ball 26 at the distal end. The extending portion 64D extending in the distal direction is formed at the distal end of the ball holder 60. Moreover, the ball pressing rod 50 biasing the writing ball 26 in the distal direction is mounted inside the ball holder 60.

Figure 11A:
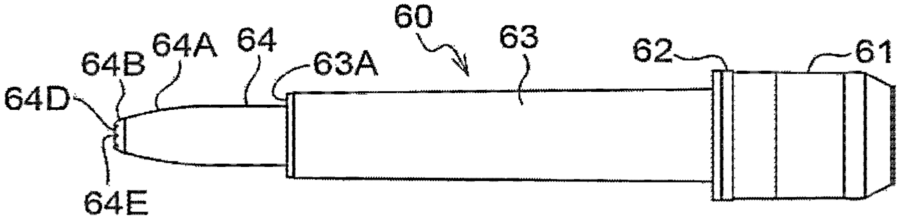
FIG. 11A is a front view of a ball holder used in the ballpoint pen refill in FIG. 9A to FIG. 9C.
Figure 11B:
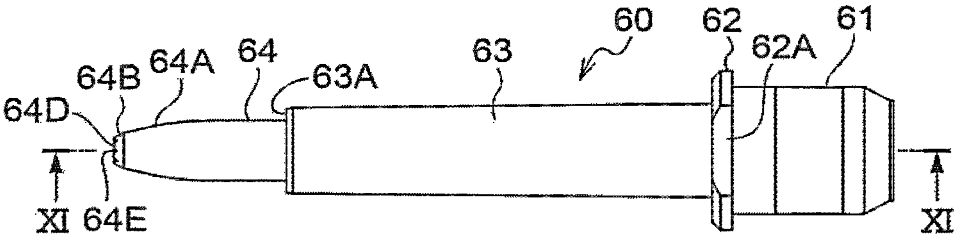
FIG. 11B is a side view illustrating the ball holder used in the ballpoint pen refill in FIG. 9A to FIG. 9C.
Figure 11C:
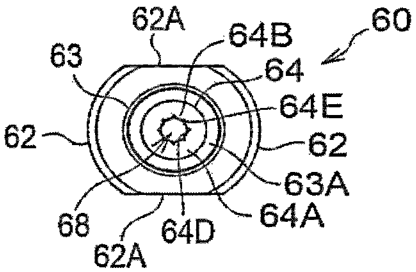
FIG. 11C is a bottom view illustrating the ball holder used in the ballpoint pen refill in FIG. 9A to FIG. 9C.
Figure 11D:
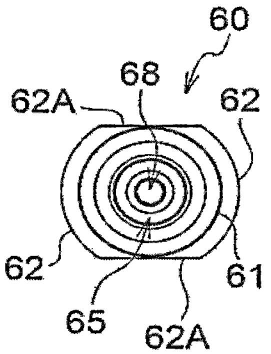
FIG. 11D is a plan view illustrating the ball holder used in the ballpoint pen refill in FIG. 9A to FIG. 9C.

The ball holder 60 used in the ballpoint pen refill 20 in FIG. 9A to FIG. 9C and FIG. 10 is illustrated in a front view (FIG. 11A), a side view (FIG. 11B), a bottom view (FIG. 11C), a plan view (FIG. 11D), a distal end side perspective view (FIG. 11E), a rear end side perspective view (FIG. 11F), a cross-sectional view taken along line XI-XI in FIG.

Figure 11E:
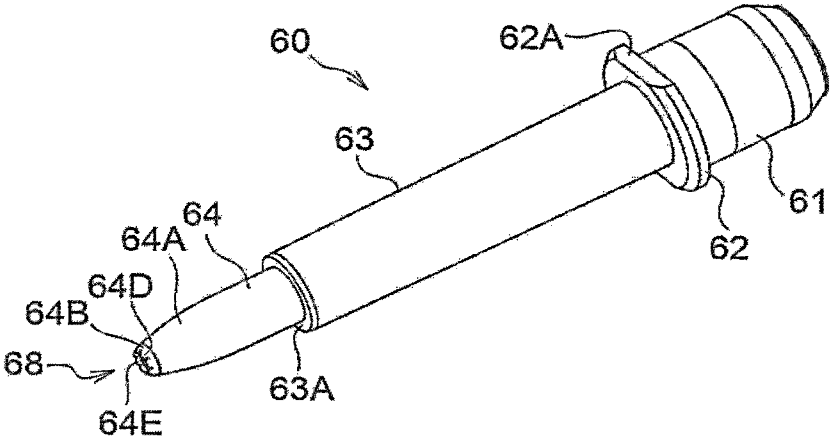
FIG. 11E is a distal end side perspective view illustrating the ball holder used in the ballpoint pen refill in FIG. 9A to FIG. 9C.
Figure 11F:
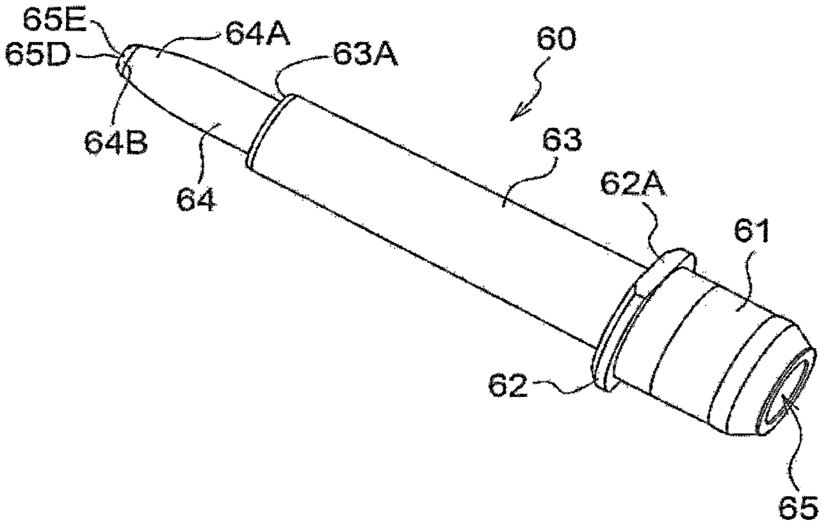
FIG. 11F is a rear end side perspective view illustrating the ball holder used in the ballpoint pen refill in FIG. 9A to FIG. 9C.
Figure 11G:
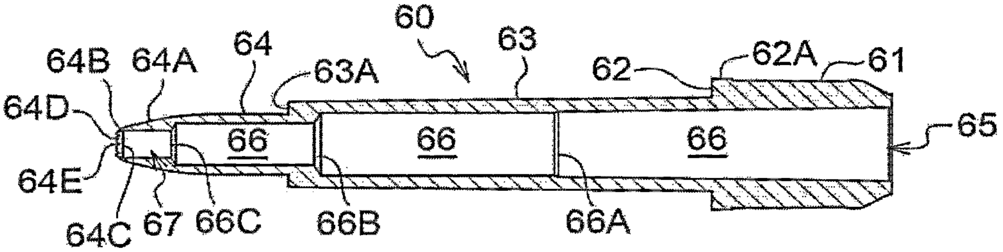
FIG. 11G is a cross-sectional view illustrating the ball holder used in the ballpoint pen refill in FIG. 9A to FIG. 9C taken along line XI-XI in FIG. 11B.
Figure 11H:
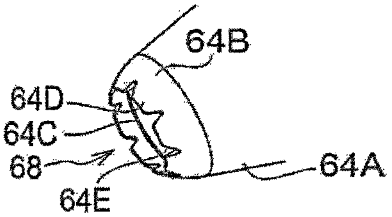
FIG. 11H is an enlarged view of a distal end part in FIG. 11E, illustrating the ball holder used in the ballpoint pen refill in FIG. 9A to FIG. 9C.
Figure 11I:
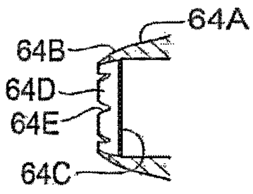
FIG. 11I is an enlarged view of a distal end part in FIG. 11G, illustrating the ball holder used in the ballpoint pen refill in FIG. 9A to FIG. 9C.

11B (FIG. 11G), an enlarged view of the distal end part in FIG. 11E (FIG. 11H), and an enlarged view of the distal end part in FIG. 11G (FIG. 11I). The ball holder 60 is made of, for example, a synthetic resin such as polyacetal or polyether ether ketone, and also as illustrated in FIG. 10, includes an attachment portion 61, a flange portion 62, an intermediate portion 63, and a distal end portion 64 from a rear end side. Note that the structure of the attachment portion 61 is similar to that of the first embodiment.

The structure of the intermediate portion 63 is similar to that of the first embodiment. The structure of the distal end portion 64 is the same as that of the first embodiment except that the extending portion 64D extending in the distal direction from the distal end edge of the caulking portion 64B is formed.

The inside of the ball holder 60 has a hollow structure as illustrated in FIG. 11G. This hollow structure is also similar to that of the first embodiment.

Note that a sealing surface 64C that comes into contact with the outer peripheral surface of the writing ball 26 is formed on the inner peripheral surface of the caulking portion 64B (see FIG. 11G and FIG. 11I). The sealing surface 64C can prevent the ink from flowing out from the distal end at the time of non-writing. Furthermore, a distal end peripheral edge of the caulking portion 64B extends in the distal direction, and this portion is the extending portion 64D. Plural slits 64E are formed from the distal end edge of this extending portion 64D to the vicinity of the distal end edge of the caulking portion 64B on the rear side.

Figure 12:
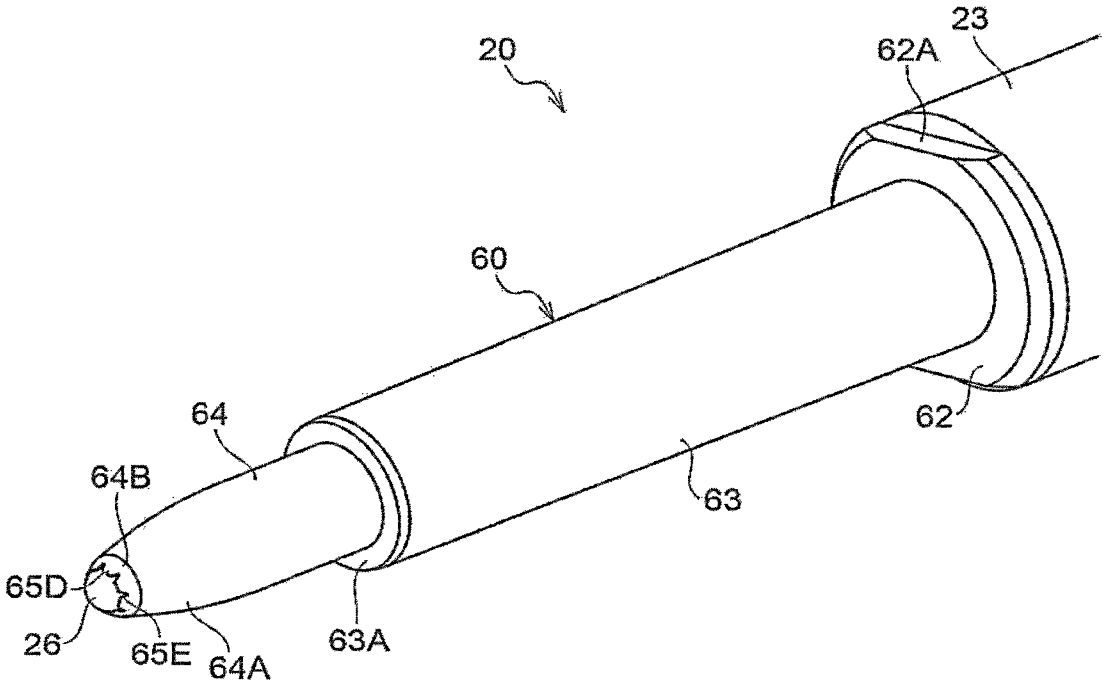
FIG. 12 is an enlarged perspective view of a distal end part of the ballpoint pen refill in FIG. 9A to FIG. 9C.

In the ballpoint pen refill 20 of this embodiment, as illustrated in the enlarged perspective view of the distal end part in FIG. 12, the writing ball 26 exposed from the distal end is held by the extending portion 64D further extending from the caulking portion 64B. Here, in the ballpoint pen refill 20 of the first embodiment not including the extending portion 64D, the dimension of the writing ball 26 coming out from the distal end edge of the caulking portion 64B is about 30% of the diameter of the writing ball 26. On the other hand, in the ballpoint pen refill 20 of this embodiment, since the extending portion 64D is provided, the dimension of the writing ball 26 coming out from the distal end edge of the extending portion 64D is about 20% of the diameter of the writing ball 26, and the holding area is further expanded. Furthermore, the plural slits 64E provided in the extending portion 64D do not prevent the outflow of the ink 24 even in a case in which the extending portion 64D is provided.

The ball pressing rod 50 (see FIG. 10) mounted inside the ball holder 60 is similar to that of the first embodiment.

Figure 13A:
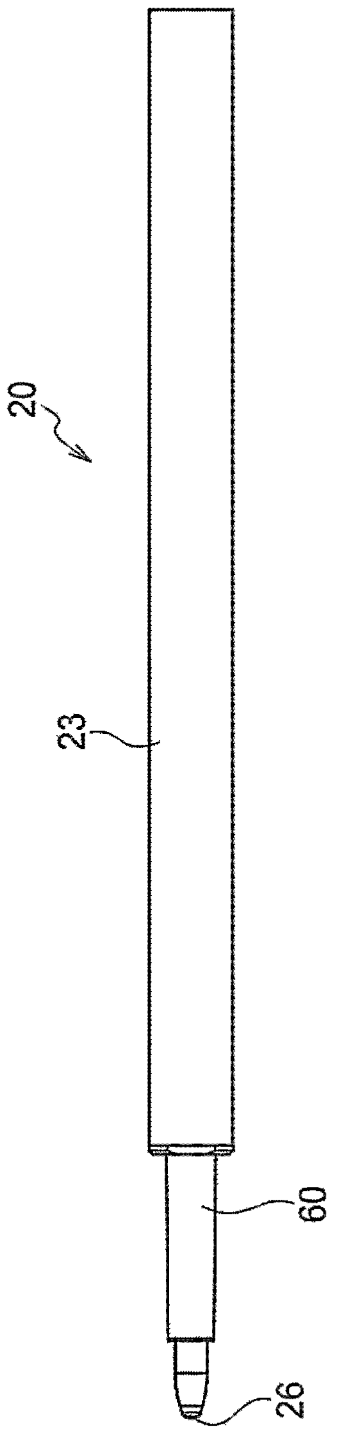
FIG. 13A is a front view illustrating a pressing state of a writing ball in the ballpoint pen refill in FIG. 9A to FIG. 9C.
Figure 13B:
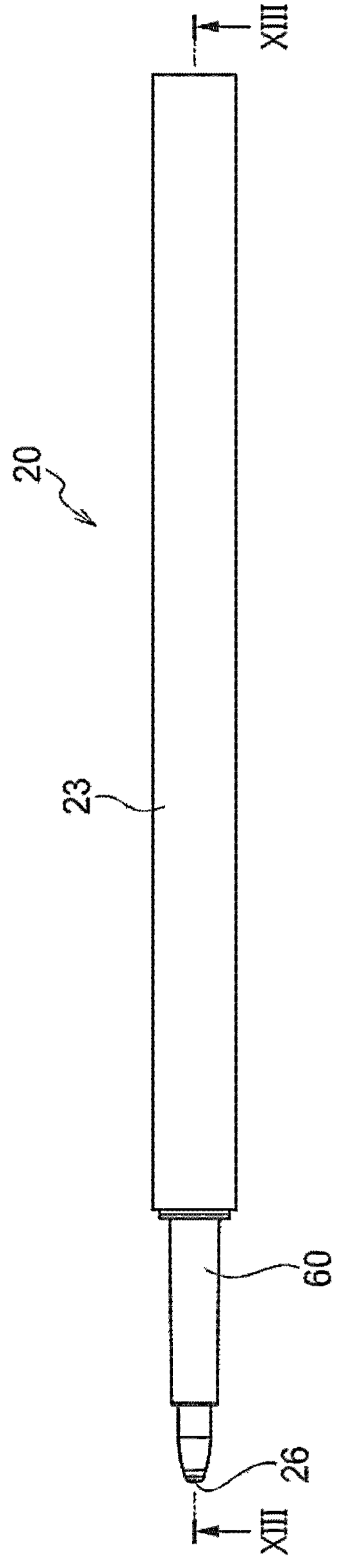
FIG. 13B is a side view illustrating the pressing state of the writing ball in the ballpoint pen refill in FIG. 9A to FIG. 9C.
Figure 13C:
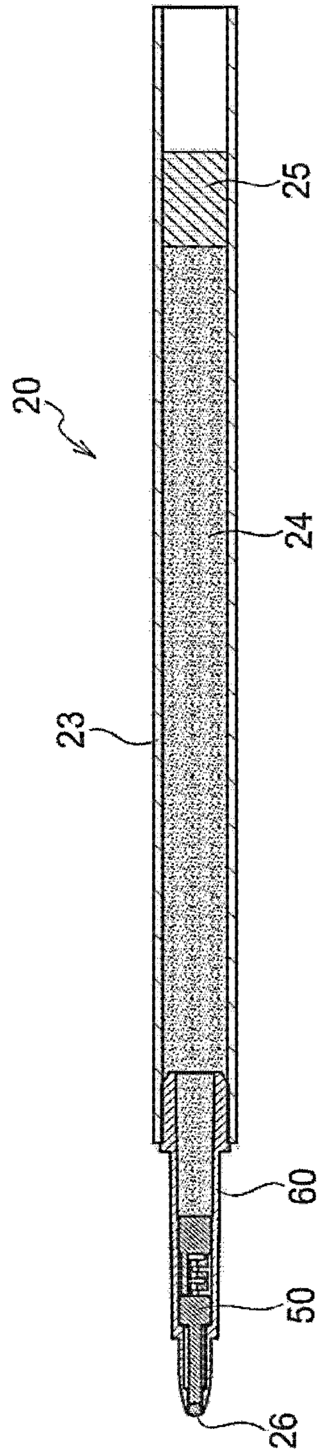
FIG. 13C is a cross-sectional view illustrating the pressing state of the writing ball in the ballpoint pen refill in FIG. 9A to FIG. 9C taken along line XIII-XIII in FIG. 13B.
Figure 14:
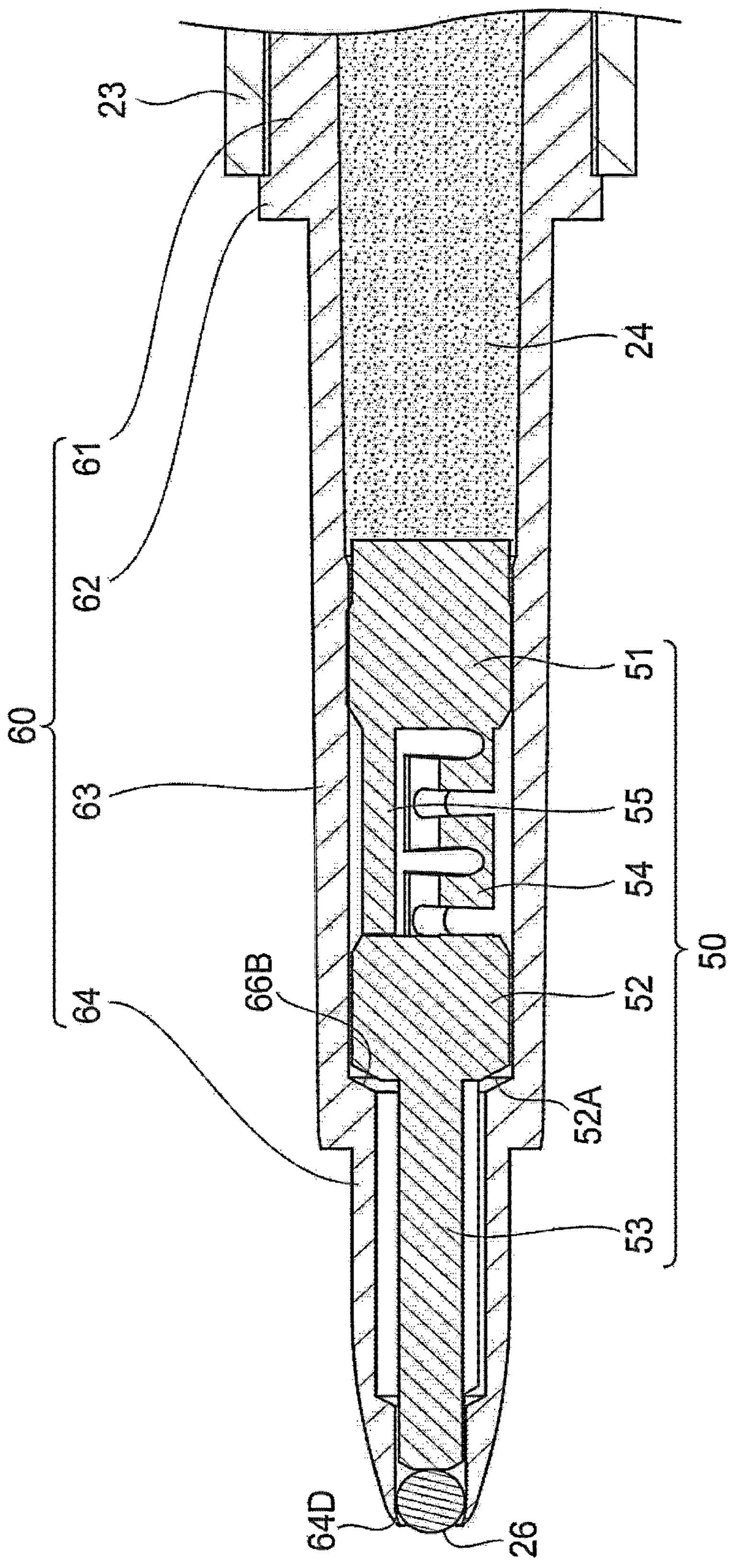
FIG. 14 is an enlarged view of a distal end part in FIG. 13C.

A pressing state in which writing pressure is applied to the writing ball 26 at the distal end of the ballpoint pen refill 20 in the state illustrated in FIG. 9A to FIG. 9C is illustrated in a front view (FIG. 13A), a side view (FIG. 13B), and a cross-sectional view taken along line XIII-XIII in FIG. 13B (FIG. 13C). In this state, the writing ball 26 moves rearward to the inside of the ball holder 60. Moreover, as illustrated in FIG. 14, which is an enlarged view of the distal end part in FIG. 13C, the movable portion 52 moves rearward by the pressing of the writing ball 26 due to the writing pressure, and the rear contact portion 52A of the movable portion 52 and the intermediate reduced diameter portion 66B of the back hole 66 are separated from each other. On the hand, the movable portion 52 comes into contact with the rearward movement restricting portion 55, and the rearward movement gap 56 that is vacant in the state illustrated in FIG. 10 disappears. Note that the shape of the ball pressing rod 50 illustrated in FIG. 14 is as illustrated in FIG. 8A to FIG. 8G in the first embodiment.

As described above, also in this embodiment, as in the first embodiment, the distal end edge of the rearward movement restricting portion 55 is the limit of rearward movement due to the pressing of the writing ball 26. Moreover, the intermediate reduced diameter portion 66B of the back hole 66 is the limit of forward movement of the ball pressing rod 50. Further, the writing ball 26 is constantly urged forward by the spring effect of the compression portion 54. Furthermore, in a case in which writing pressure is applied to the writing ball 26, the compression portion 54 compresses and bends through the movable portion 52, so that it is possible to give a user a writing feeling in which the pen tip bends. As a result, it is possible to achieve drawing line representation such as tome (stop), hane (upward brush-stroke), or harai (sweeping) like a hair brush.

Moreover, the ball holder 60 and the ball pressing rod 50 have a shape that can be injection molded with a synthetic resin, and a flow path of the ink inside the ball holder 60 is secured by the ink groove 57, the large flat surface portion 50A, and the small flat surface portion 50B provided in the ball pressing rod 50. Furthermore, since all the members constituting the ballpoint pen 10 except for the ink are made of a synthetic resin and do not use metal parts, it is not necessary to perform sorting at the time of disposal, and it is easy to recycle the synthetic resin material.

INDUSTRIAL APPLICABILITY

The invention is applicable to a ballpoint pen refill and a ballpoint pen using the same.

The invention claimed is:

1. A ballpoint pen refill comprising:
 - an ink storage tube made of a synthetic resin and storing an ink thereinside;
 - a ball holder made of a synthetic resin and attached to a distal end of the ink storage tube;
 - a ball pressing rod mounted inside the ball holder; and
 - a writing ball stored in a distal end of the ball holder and having a rear end side held by the ball pressing rod,
 - wherein the ball pressing rod includes:
   - a fixing portion fixed to the ball holder;
   - a movable portion slidable in a front-rear direction with respect to the ball holder;
   - a compression portion connecting the fixing portion and the movable portion; and
   - a rearward movement restricting portion protruding from a distal end of the fixing portion; and
 - a gap between a distal end of the rearward movement restricting portion and a rear end of the movable portion.

2. The ballpoint pen refill according to claim 1, wherein the compression portion has a bellows shape.

3. The ballpoint pen refill according to claim 2, wherein a slit is formed rearward from the distal end of the ball holder.

4. The ballpoint pen refill according to claim 2, wherein all members thereof, except the ink, are made of a synthetic resin.

5. A ballpoint pen storing the ballpoint pen refill according to claim 2 in a shaft tube.

6. The ballpoint pen refill according to claim 1, wherein a slit is formed rearward from the distal end of the ball holder.

7. The ballpoint pen refill according to claim 6, wherein all members thereof, except the ink, are made of a synthetic resin.

8. A ballpoint pen storing the ballpoint pen refill according to claim 6 in a shaft tube.

9. The ballpoint pen refill according to claim 1, wherein all members thereof, except the ink, are made of a synthetic resin.

10. A ballpoint pen storing the ballpoint pen refill according to claim 9 in a shaft tube.

11. A ballpoint pen storing the ballpoint pen refill according to claim 1 in a shaft tube.

* * * * *